United States

Wagner et al.

[11] 3,821,765

[45] June 28, 1974

[54] PHOTOGRAPHIC ARRANGEMENT WITH VIEWFINDER INDICATION OF FLASH READINESS

[75] Inventors: Karl Wagner, Ottobrunn; Eduard Wagensonner, Ascheim, both of Germany

[73] Assignee: AGFA-Gevaert Aktiengesellschaft, Leverkusen, Germany

[22] Filed: Feb. 16, 1973

[21] Appl. No.: 333,149

[30] Foreign Application Priority Data
Feb. 24, 1972  Germany............................ 2208679

[52] U.S. Cl. ............ 354/128, 350/160 LC, 354/145
[51] Int. Cl. ...................... G03b 17/20, G03b 15/05
[58] Field of Search .............. 350/160 LC; 356/227; 95/11 V, 11 R, 11.5 R, 10 R, 10 C, 10 T

[56] References Cited
UNITED STATES PATENTS

| | | |
|---|---|---|
| 3,416,422 | 12/1968 | Dietrich et al..................... 95/11 R |
| 3,424,071 | 1/1969 | Schwahn.......................... 95/11.5 R |
| 3,633,475 | 1/1972 | Cooper ............................. 95/11 R |
| 3,668,861 | 6/1972 | Hiromitsu Mitsui...... 350/160 LC X |
| 3,704,056 | 11/1972 | Wysocki et al........... 350/160 LC X |
| 3,727,527 | 4/1973 | Borowski et al.......... 350/160 LC X |
| 3,737,567 | 6/1973 | Shunsei Kratomi............... 352/57 X |

Primary Examiner—Samuel S. Matthews
Assistant Examiner—Kenneth C. Hutchison
Attorney, Agent, or Firm—Michael S. Striker

[57] ABSTRACT

A liquid crystal element is connected in parallel with the release contacts of the camera which in turn are connected to the ignition circuit of the flash unit. The liquid crystal element is arranged in the camera housing and an image of it is reflected into the viewfinder. The liquid crystal changes from a light transmissive to an opaque state when the voltage across the ignition capacitor reaches the voltage required for flash initiation.

4 Claims, 1 Drawing Figure

PATENTED JUN 28 1974
3,821,765
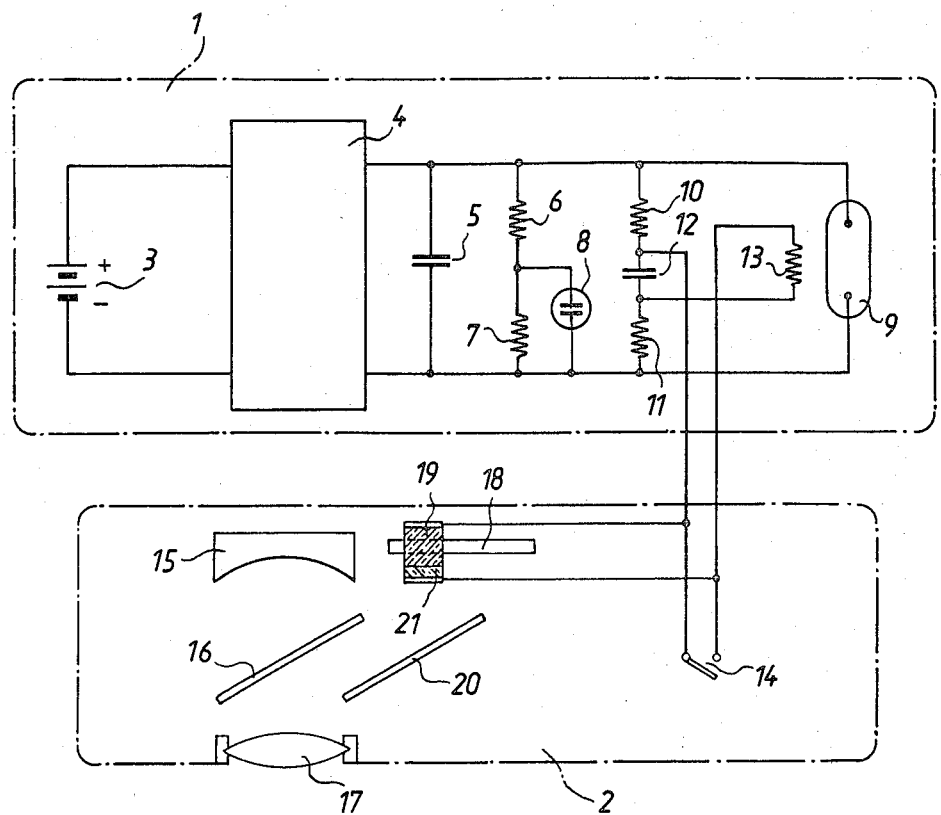

PHOTOGRAPHIC ARRANGEMENT WITH VIEWFINDER INDICATION OF FLASH READINESS

BACKGROUND OF THE INVENTION

This invention relates to a photographic arrangement having both a photographic camera and an associated electronic flash unit.

As a rule, glow lamps are arranged within the electronic flash units to indicate when the ignition capacitor has charged to a sufficiently high voltage to ignite the flash tube. When using such units, the photographer must, after firing a flash, remove the camera from his eye in order to determine whether or not the glow lamp has relit, indicating readiness for the next flash.

SUMMARY OF THE INVENTION

It is an object of the present invention to supply a simple arrangement which, without making any major changes in the elements normally constituting the camera and the flash unit, allows an indication to be made of the readiness of the equipment for the next flash, which does not require the photographer to remove the camera from his eye.

The present invention resides in a photographic arrangement having a camera including a camera housing and a viewfinder and an associated electronic flash unit. It comprises synchronous release contact means arranged in said camera housing. It further comprises ignition circuit means in the electronic flash unit for initiating a flash upon activation of the synchronous release contact means. Liquid crystal means having an optical characteristic varying as a function of voltage applied thereto are connected to the synchronous contact means and undergo a change in an optical characteristic when the voltage across said synchronous capacitor exceeds a predetermined voltage. Optical means are provided for furnishing an image of said fluid crystal means in the viewfinder of said camera.

Liquid crystal means in accordance with the present invention comprise both controllable light barriers and controllable reflectors which make use of the particular characteristics of crystalline liquid. For example, a liquid crystal element may comprise a first and second glass plate which have light-transmissive conducting layers on the two surfaces which face each other. A liquid crystal layer is arranged between the two conductive surfaces. Thus electrically the liquid crystal element is a capacitor in which the crystalline fluid acts as a dielectric. When a voltage is applied to the liquid crystal element, the element becomes opaque when the voltage exceeds a particular threshold value. If a polarization foil is also used, the liquid crystal element can become substantially opaque when sufficiently high voltage is applied thereto. When the voltage is removed, the liquid crystal element again becomes fully transparent. If the liquid crystal elements act as capacitors, the optical behavior of the liquid crystal elements can be controlled with only a very small control power. The power so required is negligible with respect to the power required for the ignition of the electronic flash.

The arrangement in accordance with this invention thus has the advantage that the user of the camera and the flash unit may see in the viewfinder when the electronic flash is ready for operation, without removing the camera from his eye.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE shows the interconnection of the liquid crystal element of the present invention with the relevant parts of the electronic flash unit and the camera.

DESCRIPTION OF THE PREFERRED EMBODIMENTS

A preferred embodiment of the present invention will now be described with reference to the drawing.

The electronic flash unit 1 has a voltage source 3 which constitutes the input to a regulated power supply 4 at whose output is connected the main energy storing capacitor 5. This capacitor stores the energy required for the flash. A voltage divider having resistors 6 and 7 is connected in parallel with capacitor 5. A glow lamp 8 is connected in parallel to resistance 6. This glow lamp is visible through an opening in the housing of the electronic flash unit. A flashtube has reference numeral 9. Two high ohmic resistors 10 and 11 are connected in series with the ignition capacitor 12. One terminal of the ignition capacitor 12 is directly connected to the ignition coil 13, while the other terminal is connected to the second terminal of ignition coil 13 through synchronous release contacts 14 which are arranged in camera housing 2. Elements 10,11,12 and 13 constitute the ignition circuit for flashtube 9.

As mentioned above, the camera housing is designated by reference numeral 2. The viewfinder of the camera has reference numerals 15,16 and 17. A light-frame mask 18 carries a liquid crystal element 19. Mask 18 and liquid crystal element 19 are pictured in the viewfinder by means of a mirror 20.

When the electronic flash unit 1 is first activated, the voltage across ignition capacitor 12 increases steadily. When this voltage exceeds a predetermined voltage, namely the voltage required for ignition of flashtube 9, liquid crystal element 19, which also has a polarization foil 21, becomes opaque. The user of the camera thus sees within the viewfinder that the electronic flash unit is ready for ignition and for flash generation. After synchronous contact 14 is activated, namely closed, the main storage capacitor 5 discharges through the flashtube 9. The voltage across fluid crystal element 19,21 becomes substantially zero, causing the liquid crystal element again to become transparent.

While the invention has been illustrated and described as embodied in a particular arrangement for interconnecting the liquid crystal element with the ignition circuit, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a photographic arrangement having a camera including a camera housing and a viewfinder, and an electronic flash unit, in combination, synchronous release contact means arranged in said camera housing; ignition circuit means including ignition capacitor means arranged in said electronic flash unit and electrically connected to said synchronous release contact means for initiating said flash upon activation of said synchronous release contact means; liquid crystal means having an optical characteristic varying as a function of voltage applied thereto, arranged in said camera housing and connected to said synchronous contact means in such a manner that a predetermined change in said optical characteristic occurs when the voltage across said capacitor means is a predetermined voltage; and optical means for furnishing an image of said liquid crystal means in said viewfinder of said camera.

2. A photographic arrangement as set forth in claim 1, wherein said predetermined voltage is the voltage required for said flash initiation.

3. A photographic arrangement as set forth in claim 2, wherein said liquid crystal means changes from a light transmissive to an opaque state when said voltage across said ignition capacitor means exceeds said predetermined voltage.

4. A photographic arrangement as set forth in claim 1, wherein said liquid crystal means comprise a fluid crystal element and a polarization foil.

* * * * *